United States Patent [19]
Harper et al.

[11] Patent Number: 5,776,046
[45] Date of Patent: Jul. 7, 1998

[54] DOILIES AND METHOD OF MANUFACTURING SAME

[75] Inventors: Howard E. Harper, Redding, Conn.; Robert D. Tarr, Jr., Middletown, Ohio

[73] Assignee: Mafcote Industries, Inc., Norwalk, Conn.

[21] Appl. No.: 829,325

[22] Filed: Mar. 27, 1997

[51] Int. Cl.$^6$ .................................................. B31D 1/04
[52] U.S. Cl. .................. 493/342; 493/335; 493/955; 156/247; 156/209; 156/289; 427/363
[58] Field of Search .......................... 493/346, 330, 493/328, 955; 427/211, 208, 208.4, 356, 363, 289; 156/209, 242, 289

[56] References Cited

U.S. PATENT DOCUMENTS

| | | | |
|---|---|---|---|
| 3,537,874 | 11/1970 | Ramey | 156/247 |
| 3,674,619 | 7/1972 | Scher | 156/209 |
| 4,614,677 | 9/1986 | Pennace | 427/208 |
| 5,201,976 | 4/1993 | Eastin | 427/208.4 |
| 5,487,915 | 1/1996 | Russ | 427/208.4 |
| 5,587,244 | 12/1996 | Flinchbaugh | 428/447 |

*Primary Examiner*—Jack W. Lavinder
*Attorney, Agent, or Firm*—Ware, Fressola, Van der Sluys & Adolphson LLP

[57] ABSTRACT

A method of producing doilies includes coating sheets of paper stock with a lubricious release fluid, collecting the sheets into a multi-layered web, and cutting and embossing doilies from the web. The fluid is preferably a solution of mineral oil and silicone, and results in the doilies being more easily separable after being adhered by the cutting and embossing process. A solution of mineral oil and 15%–40% silicone is disclosed.

19 Claims, 3 Drawing Sheets

DOILIES AND METHOD OF MANUFACTURING SAME

FIELD OF THE INVENTION

The invention herein relates to improved doilies and a method of manufacturing the same, such that the doilies are provided to the consumer in an easily separated stack.

BACKGROUND OF THE INVENTION

Paper doilies are manufactured by passing paper stock between a die roller and one or more backer rollers. The die roller includes cutting dies which cut the exterior shape of the doily from the paper stock and also cut openings in the doily to simulate the appearance of crocheted lace. The die roller often includes an embossing portion, which operates against a cooperating backing roller to impart texture to the doily, thereby further simulating the appearance of cloth and, in some instances, embroidery.

To achieve efficiencies of manufacture, several sheets of paper stock are superimposed or layered and are passed together as a multi-layer web between the die roller and the cooperating backer rollers. Thus, the die roller operates to create a stacked plurality of doilies. The die roller generally contains several individual die portions deployed across the width of the roller, so that several stacks of doilies may be cut and embossed simultaneously from the entire width of the web.

Substantial pressure is required to cut and emboss the layered paper web in order to form stacks of the doilies, and, of course, higher pressures are required for higher numbers of layers. The pressures involved can cause the stack of doilies to stick together to the point where the consumer cannot separate them easily. The problem is exacerbated in doilies having a substantial number of cut out areas, in that when the thin strips of paper located between the cut out areas stick to the corresponding thin strips of the adjacent doily, the strips often tears upon attempted separation. There are four levels of this phenomenon, namely: level 1, wherein the doilies are stuck together and cannot be separated without substantial damage; level 2, wherein the consumer through careful manipulation can separate the doilies without tearing or with minimal tearing; level 3, wherein the doilies adhere to each other but can be readily separated with ordinary care in doing so; and level 4, wherein the doilies freely fall from each other upon handling of the stack of doilies. Level 4 is somewhat undesirable from a manufacturing standpoint, as it is difficult to package doilies that separate too easily.

Also, the tendency of the layered paper web to stick together as a result of the cutting and embossing process creates multi-layered chips from the cut out portions of the doilies. These chips have a tendency not to disperse from the stack of doilies until the consumer separates the doilies, leaving a confetti effect in the vicinity of the separation and sometimes leaving unsightly chips stuck in the open area of the doily.

The problem of adjacent doilies sticking together can be minimized through the use of certain papers having relatively long fibers and hard surface finishes, but such paper is expensive for use in the manufacturing of the doilies and can also be difficult to cut. There are other conditions which affect the tendency of the doilies to stick to each other, including the humidity at the time of production, the moisture content of the paper (for instance, if it has been stored for a period of time under high humidity conditions), the type of paper, any coating thereon and whether the coating is on one side or two sides, and the specific pattern of the doily. The problem is clearly exacerbated with respect to doilies having a large number of cut out areas and a deeply embossed texture.

Mineral oil has been applied to surfaces of the paper stock, in an effort to lubricate the interface between adjacent layers of paper and thereby reduce the tendency of the doilies to stick together. Using mineral oil, it is generally possible to produce doilies in pluralities of three layers, and sometimes four layers, with a level 2 or level 3 degree of separation, i.e., separable with care and sometimes readily separable. However, Level 2 is not very desirable. Therefore, manufactureability varies between three and four layers. Some manufacturing runs are somewhat more successful than others, e.g., because of the factors noted above, and problems with separability are not uncommon in four layer stacks of doilies.

It should now be apparent that efficiency of manufacture would be improved if more than three layers of doilies could be produced reliably, and the doilies themselves could be improved if they demonstrated consistent ease of separation.

SUMMARY OF THE INVENTION

It is an object of the invention herein to improve efficiency in manufacturing doilies.

It is an additional object of the invention herein to facilitate manufacturing doilies in multiple layers.

It is a further object of the invention herein to utilize existing equipment in the efficient manufacture of improved doilies.

It is another object of the invention herein to achieve improved disbursal of chips in the manufacture of open pattern doilies.

It is also an object of the invention herein to provide improved doilies.

It is an additional object of the invention herein to provide doilies in multiple layers with ease of separation.

In accomplishing these and other objects of the invention, there is provided a method of manufacturing doilies including dissolving or mixing a release agent in a lubricous liquid carrier to form a lubricous release fluid and applying the lubricous release fluid to selected surfaces of a plurality of sheets of paper stock. The sheets of paper stock are superimposed into a multiple layer paper web, and the layered web is passed between a die roller and at least one backer roller. The die roller cuts a plurality of stacked doilies from the layered web, including any desired openings in the doilies forming a pattern. The die roller also embosses any desired texture thereon.

According to certain aspects of the invention, the liquid carrier is mineral oil and the release agent is selected from the group consisting of silicone, surface active fluorocarbons, polytetrafluoroethylene metallic stearates, and platelet micro-crystalline structures, such as mica.

Further aspects of the invention reside in a lubricous release fluid consisting of 2½ to 50% silicone in mineral oil. A deposition rate of 0.059 pounds wet of the fluid per 475,000 square inches of paper stock surface is contemplated by the invention. This results in from 0.0013 lb. to 0.0295 lb. of dry-equivalent silicone per 475,000 square inches. Variances in the wet deposition rate may be employed to provide application of dry-equivalent silicone in the same range to the paper stock.

According to further aspects of the invention, the lubricious release fluid is applied to all or some surfaces of the paper stock, as required for ease of separation of the plurality of stacked doilies. It is contemplated that up to six sheets of paper stock may be coated and cut into doilies.

The invention also resides in a stacked plurality of paper doilies, wherein the adjacent surfaces of the doilies have a lubricous release fluid applied thereto, the fluid including a lubricious liquid carrier and a release agent, as discussed above. According to additional aspects of the invention, the doilies have cut out openings and embossed surface texture.

The various features of novelty which characterize the invention are pointed out with particularity in the claims annexed to and forming a part of this specification. For a better understanding of the invention, its operating advantages, and specific objects attained by its use, reference is made to the accompanying drawings and description preferred embodiments of the invention set forth below.

DRAWINGS

The same reference numerals refer to the same elements throughout the various figures.

DESCRIPTION OF PREFERRED EMBODIMENT

Figure 1:
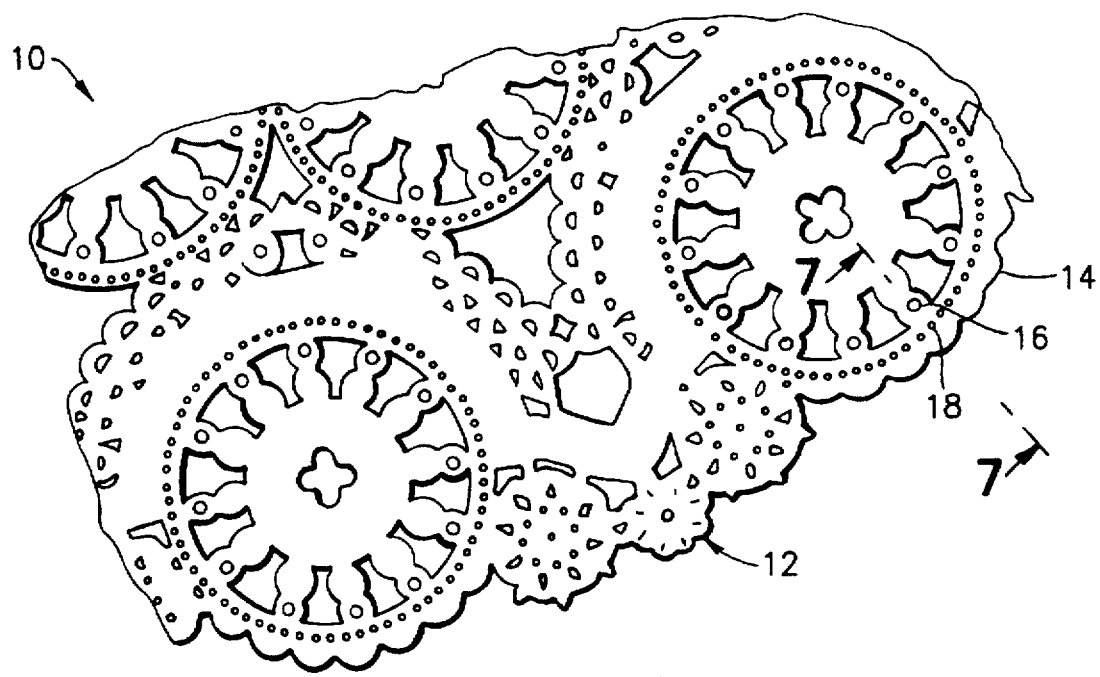
FIG. 1 is an enlarged segmental plan view of a stack of doilies according to the invention herein, manufactured according to the processes of the invention.

FIG. 1 is a segmental plan view of a stack of doilies 10, including a top doily 12 according to the invention herein, the doily 12 and stack of doilies 10 all being manufactured in accordance with the process of the invention herein. The doily 12 is fabricated of paper, and more particularly, is cut from a sheet of paper such that it has a cut periphery 14. The doily 12 further includes a plurality of cut out openings, such as openings 16 and 18, the openings being arranged in a pattern to simulate lace. The doily 12 is also embossed with ridges, such as the ridges 20 and 21 best seen in FIG. 7, the embossed ridges further imparting the appearance of fabric to the paper doily 12.

Figure 2:
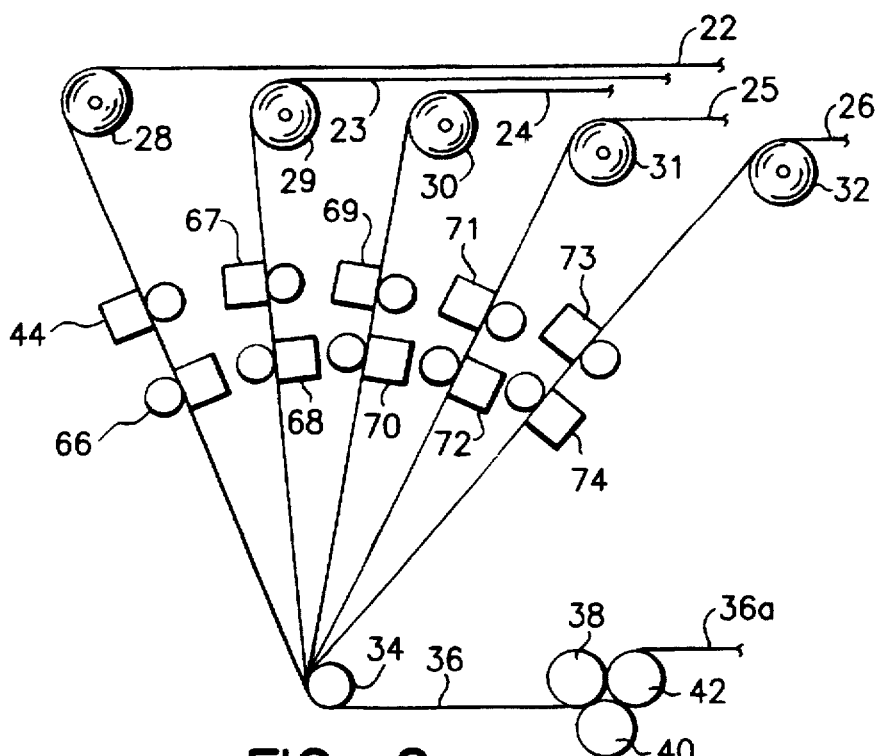
FIG. 2 is a schematic view of the apparatus and process for manufacturing the doilies of FIG. 1.
Figure 6:
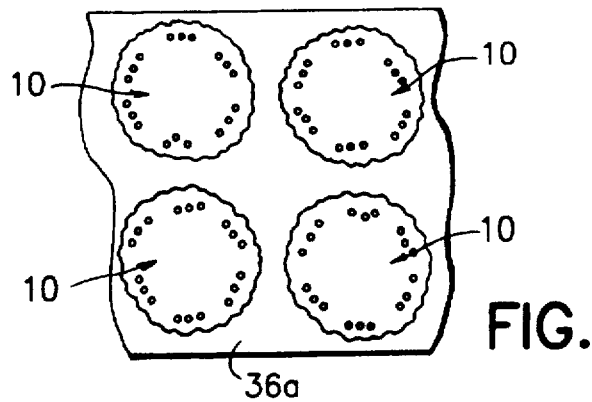
FIG. 6 is a schematic plan view of a layered web of paper stock illustrating plural stacks of doilies formed therefrom.

FIG. 2 illustrates the apparatus and process of manufacturing the stack of doilies 10, which in the embodiment shown consists of five individual doilies. Accordingly, there are provided five sheets of paper stock 22–26 which are delivered from supply rolls, not shown. Associated with each of the five sheets of paper stock, respectively, are five feed rollers 28–32 which direct the sheets to a main collection roller 34. At the collection roller 34, the sheet stock is superimposed into a multi-layered web 36 which passes sequentially between a die roller 38 and a first backer roller 40, and thereafter between the die roller 38 and a second backer roller 42. The layered web 36 exits the die roller and backer rollers as web 36a, having a plurality of stacks 10 of doilies cut therefrom as illustrated in FIG. 6. This general process of making doilies is well known in the art, and will not be discussed in further detail for that reason.

The sheet stock in the embodiment described is 40 lb. tablet grade paper, approximately 0.003 inches thick. The paper is uncoated. It will be appreciated that different grades, weights and thicknesses of paper may also be used.

Figure 3:
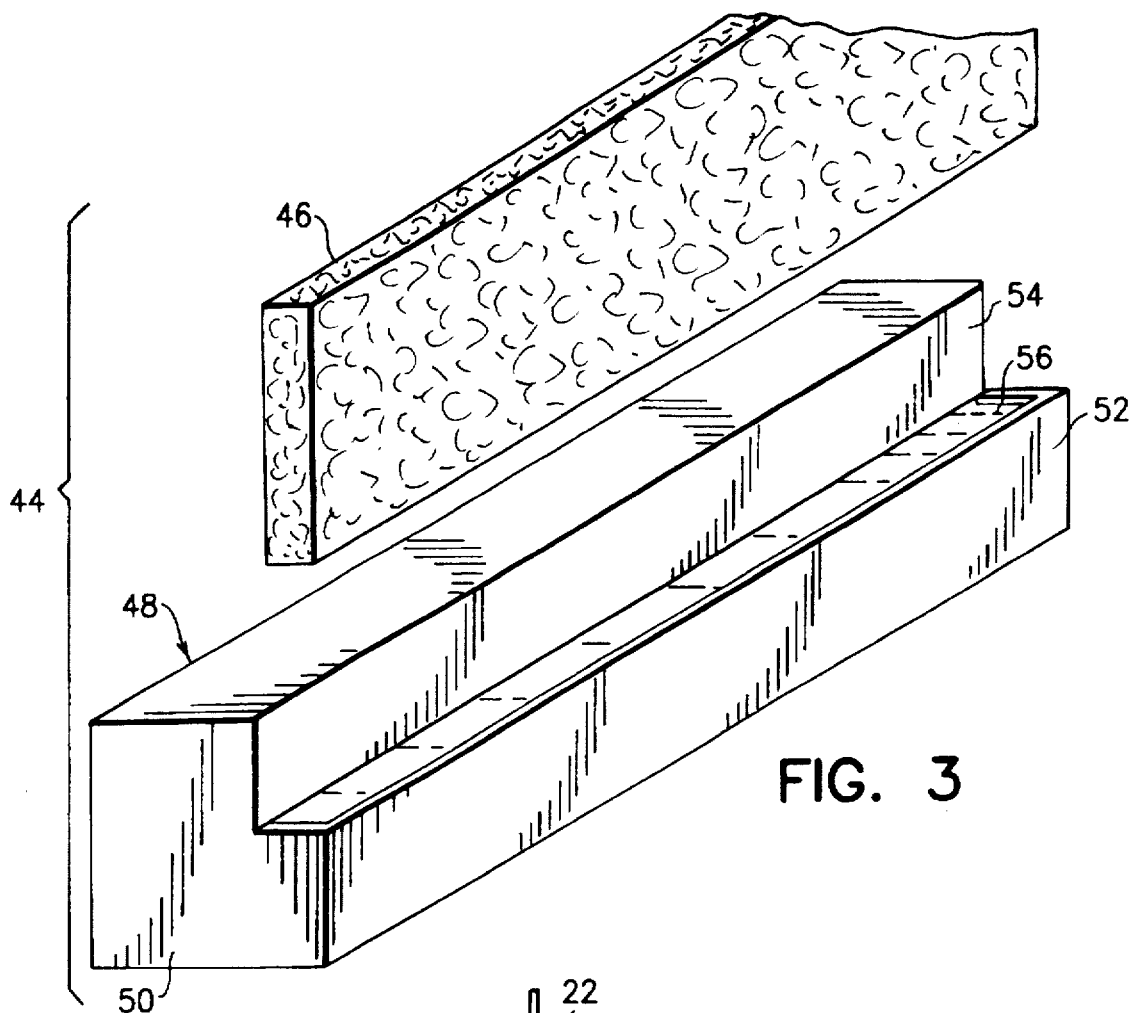
FIG. 3 is an exploded perspective view of an applicator used in the manufacturing process of FIG. 2.
Figure 4:
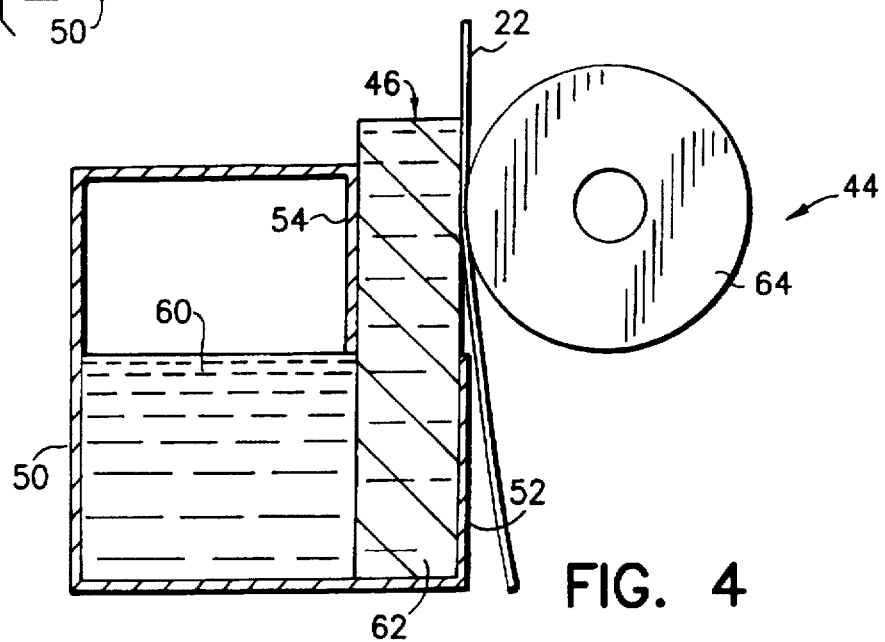
FIG. 4 is a sectional view of the applicator of FIG. 3.

Prior to collecting the sheet stock 22–26 into the multi-layer web 36, the surfaces of the sheet stock are coated with a lubricous release fluid 60. The lubricous release fluid is applied by oilers, such as oiler 44 illustrated in FIGS. 3 and 4. The oiler 44 consists of an applicator pad 46 in a reservoir 48. The reservoir 48 consists of a housing 50 including a trough 52 extending laterally outwardly beyond an upper side wall 54, thereby defining a trough opening 56. The applicator pad 46 is closely received in the trough 52, and extends upwardly to lie against the upper sidewall 54. The lubricous release fluid 60 is supplied to the reservoir 48, and maintained at a level sufficient to soak the lower portion 62 of the applicator pad 46.

The oiler 44 is provided with a roller 64, and paper sheet stock 22 is fed between the roller 64 and the applicator pad 46. The pad 46 absorbs the fluid 60 and wicks it throughout the pad. Therefore, when the roller 64 biases the sheet stock 22 against the applicator pad 46, the applicator pad 46 being supported by the upper side wall 54, the surface of the sheet stock 42 adjacent to the applicator pad 46 receives an application of the lubricous release fluid 60.

With reference to FIG. 2, the oiler 44 and oilers 66–74 together apply lubricous release fluid 60 to all the surfaces of the sheet stock 22–26 prior to collecting the sheet stock into the multi-layer web 36. It is also contemplated that other means of applying the lubricious release fluid may be used, such as spraying.

It will be appreciated that certain operating conditions may not require an application of fluid to all the surfaces, and an experienced operator may be able to delete an application of fluid to one or more surfaces with successful results. Because of the number of variables involved, such as the temperature, humidity, type of paper stock, humidity content of the paper stock, particular doily pattern and its intricacy, conditions of the dies, pressure adjustment of the die and backer rollers, and the like, withholding the application of fluid to a particular surface is more a matter of operating experience than predictable operating procedure. The most important consideration is the design of the doily pattern itself. Patterns with more cut out areas and/or deeper embossing separate with significantly more difficulty than patterns with less cut out areas and/or flatter embossing. However, as a matter of generalization, if the application of fluid is withheld from a surface, it is generally possible to withhold it from one of the upper sheets of stock rather than one of the lower sheets.

The preferred lubricous release fluid is silicone dissolved in mineral oil carrier. The percentage of silicone in the solution varies between about 2½% to about 50%, depending upon the sticking tendency of the doilies, which is a function of the factors discussed above.

Mineral oil is the preferred carrier fluid because silicone is readily dissolvable therein, and also because mineral oil is colorless, odorless, tasteless, and ingestible. It is considered a "food grade" material, so that food which has contacted a doily treated with mineral oil may be eaten safely. Although vegetable oils such as olive oil and corn oil also have many of these advantages, mineral oil is also stable, i.e., it does not spoil or become rancid over time.

Solvents such as 1-1-1 trichloroethane are also suitable for the ability to accept silicone in solution, but tend to give off vapors which require care in manufacturing and the finished doilies also can have lingering odor from residual release of those vapors.

The release agent is preferably silicone, as it also enjoys the advantages of being colorless, odorless, tasteless, ingestible and stable. However, the release agent can also be selected from the group consisting of silicone, surface active fluorocarbons, metallic stearates including zinc stearate and calcium stearate, and platelet micro-crystalline structures such as mica. The preferred lubricous release fluid is available from Camie-Campbell, Inc. of St. Louis, Mo., Product L-7067. Various percentage solutions of silicone are available under that product number.

The oilers 44 and 66–74 apply approximately 0.059 pounds wet of the mineral oil and silicone solution to 475,000 square inches (one ream) of the sheet stock surface. Therefore, at 2½% silicone and 97½% mineral oil, the amount of silicone applied is 0.0013 pounds per 475,000 square inches of sheet stock. Given relatively ideal conditions, such as low humidity and low to normal pressures in the die and backer roller process, there is detectable improvement in separation of doilies made from such sheet stock, as compared to sheet stock with no lubricant applied and to sheet stock with just mineral oil applied.

Using 50% silicone and 50% mineral oil solution, the application of 0.059 pounds of solution wet per 475,000 square inch results in the application of 0.0295 pounds of silicone per 475,000 square inches of sheet stock. There is a substantial improvement in ease of separation at this percentage; however, at percentages of 50% or more, the doilies become so easily separable that they are difficult to handle for packaging, the economics become unrealistic (the cost of silicone is substantially higher than the cost of mineral oil alone), and the application by the oilers is increasingly more difficult. Further, at the high level of silicone, the manufactured doilies become quite slippery to the point of being unacceptable for retaining food items and dishes.

Excellent results are obtained with a lubricous release fluid consisting of 30% silicone and 70% mineral oil. With the oilers described above, this results in 0.0177 pounds of silicone applied to 475,000 square inches of sheet stock. The range of 15% to 40% silicone is believed to be the preferred range, resulting in from 0.009 to 0.0236 pounds of silicone per 475,000 square inches of stock. The amount of silicone deposited is expressed separately from the amount of fluid in that different oilers or other applications devices having a different application rate may require higher or lower concentrations of silicone as a percentage of fluid to achieve the same application of silicone per unit of area. It will further be recognized that the aforementioned results are for a doily design considered average in complexity and degree of embossing.

Figure 5:
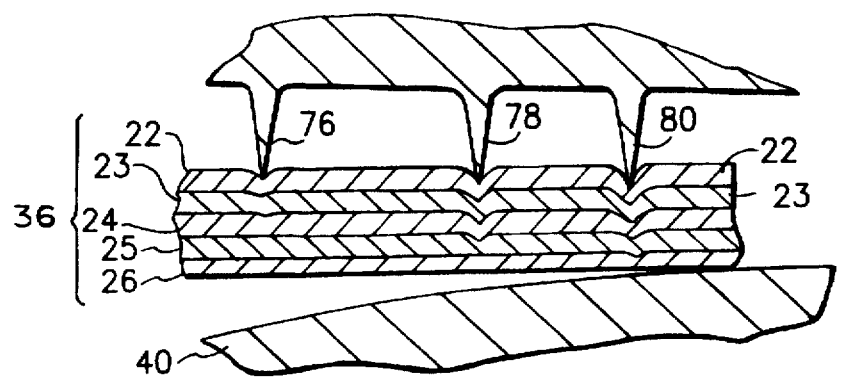
FIG. 5 is an enlarged segmental sectional view of a cutting die used in the manufacturing process of FIG. 2.

With reference to FIG. 5, the die roller 38 is seen to consist of a plurality of cutters 76, 78 and 80 operating against the first backer roller 40. As shown in FIG. 5, the cutters 76, 78 and 80 have cut through the upper sheet stock 22 and part way through the next layer of sheet stock 23, with the advance pressure the cutters beginning to deform the underlying layers of sheet stock 24–26. As noted above, the layers of sheet stock together for the multiple layer web 36. The first backers roller 40 accepts minimal contact with the cutters 76, 78 and 80 at the conclusion of their cut through the web 36 so as not to dull the cutters. The cutters form the cut peripheries of the stack of doilies 10 as well as the openings in the doilies, as illustrated by the periphery 14 and openings 16 and 18 in the segment of doily 12 shown in FIG. 1.

To keep the doilies from sticking together, it is preferred that the cutters pass cleanly through the paper sheet stock with a minimal amount of tearing. Tearing of the paper develops ragged edges, which tend to mesh together and cause the doilies to stick together, as well as creating difficulty in removing chips from the cut out openings. The lubricous release fluid 60 is believed to provide lubrication to the cutters 76, 78 and 80, permitting them to pass more readily through the sheet stock and provide cleaner cuts and therefore less sticking chips.

Figure 7:
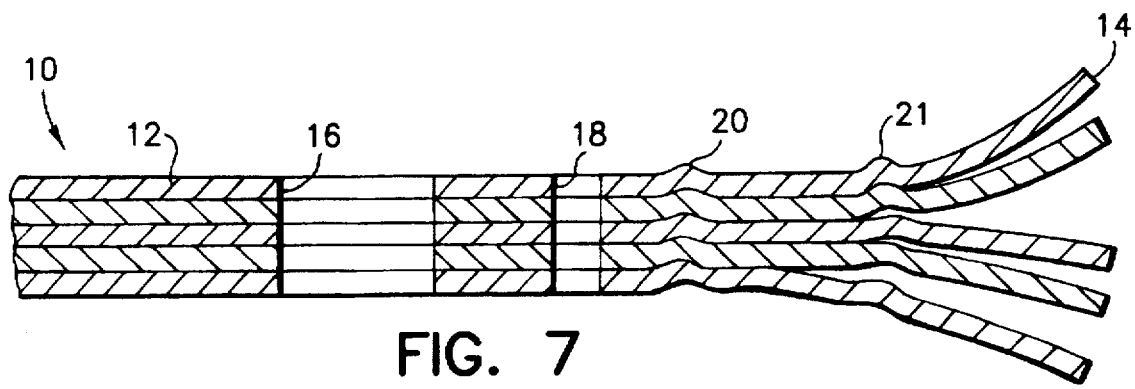
FIG. 7 is an enlarged sectional view, partially cut away, of the stack of doilies of FIG. 1, taken along the lines 7—7 of FIG. 1.

The die roller 38 also has an embossing pattern, not shown because it is well known in the art, which is applied to the web 36 as it passes between die roller 38 and backer roller 42. With reference to FIG. 7, the result of the embossing are apparent in the ridges 20 and 21 imparted to the finished stack of doilies 10. The pressure from embossing is a significant factor in causing the doilies to stick together, a tendency which is substantially reduced by the application of lubricous release fluid as described above.

With reference to FIG. 7, the stack of doilies 10 manufactured in accordance with the foregoing process characterized by the application of a lubricous release fluid to the sheet stock from which the doilies are formed, results in a stack of doilies which separates easily and without tearing of the doily pattern. The ease of separation that can be achieved in a greater number of layers of sheet stock in the multi-layered web 36 and FIG. 7 indicates a plurality of five doilies which may be readily and easily separated by the consumer.

Accordingly, the preferred embodiments of a process for manufacturing doilies and doilies that manufactured by that process have been described which admirably achieve the objects of the invention herein. With reference to the description of the preferred embodiments, those skilled in the art will appreciate that modifications may be made without departing from the spirit of the invention. Therefore, it is not intended that the scope of the invention be limited to the specific embodiment illustrated and described. Rather, it is intended that the scope of the invention be determined by the appended claims and equivalents thereof.

WE CLAIM:

1. A method of producing doilies comprising the steps of:
   A) applying a lubricious release fluid to selected surfaces of a plurality of sheets of paper stock;
   B) superimposing the plurality of sheets of paper stock into a multi-layered paper web; and
   C) passing the multi-layered paper web between a die roller having doily-pattern cutters thereon and a backer roller.

2. A method of producing doilies as defined in claim 1, wherein the lubricious fluid is mineral oil and a release agent selected from the group consisting of silicone, surface active fluorocarbons, polytetrafluoroethylene metallic stearates, and platelet micro-crystalline structures.

3. A method of producing doilies as defined in claim 1, wherein the lubricous release fluid comprises a solution of silicone and mineral oil.

4. A method of producing doilies as defined in claim 3, wherein the silicone is within the range of 2½% to 50% of the lubricious release fluid.

5. A method of producing doilies as defined in claim 3, wherein the silicone is in the range of 15% to 40% of the lubricious release fluid.

6. A method of producing doilies as defined in claim 3, wherein the lubricious release fluid is applied to a surface of paper stock at a deposition rate of 0.0015–0.0295 lbs. of silicone per 475,000 square inches.

7. A method of producing doilies as defined in claim 3, wherein the lubricious release fluid is applied to a surface of paper stock at a deposition rate of 0.0089–0.0236 pounds of silicone per 475,000 square inches.

8. A method of producing doilies as defined in claim 3, wherein the lubricious release fluid is applied to a surface of paper stock at a deposition rate of approximately 0.06 pounds per 475,000 square inches.

9. A method of producing doilies as defined in claim 1, wherein the lubricous release fluid comprises a solution of silicone and 1-1-1 trichloroethane.

10. A method of producing doilies as defined in claim 1, wherein the rate of deposition of the lubricious release fluid is adjusted so that the doilies adhere in a stack for packaging, but separate without any adherence or tearing of portions of adjacent doilies.

11. A method of producing doilies as defined in claim 1, wherein the lubricious release fluid is applied to all surfaces of the sheets of paper stock.

12. A method of producing doilies as defined in claim 1, wherein the surfaces of the sheet stock to which the lubricious release fluid is supplied are selected so that the doilies adhere in a stack for packaging, but separate without any adherence or tearing of portions of adjacent doilies.

13. A method of producing doilies as defined in claim 1, wherein the lubricious release fluid is applied to the sheets of paper stock as the paper stock is fed to the die roller.

14. A method of producing doilies as defined in claim 13, wherein the lubricious release fluid is applied by passing the sheets of paper stock over an applicator pad containing the lubricious release fluid.

15. A method of producing doilies as defined in claim 1, wherein the multi-layered web includes at least four sheets of paper stock.

16. A method of producing doilies as defined in claim 1, wherein the sheets of paper stock are 40 lb. tablet grade paper.

17. A method of producing doilies as defined in claim 1, wherein the die roller also embosses the doilies.

18. A method of producing doilies comprising the steps of:
  A) applying a lubricious release fluid comprising a solution of mineral oil and from 15%–40% silicone to all surfaces of a plurality of at least four sheets of paper stock;
  B) superimposing the plurality of sheets of paper stock into a multi-layered paper web; and
  C) passing the multi-layered paper web between a die roller having doily-pattern cutters and embossing surfaces thereon and a backer roller for the cutters and embossing surfaces.

19. A method of producing doilies as defined in claim 1, wherein the lubricious release fluid is applied to the sheets of paper stock by passing each surface of the paper stock over an application pad containing the lubricious release fluid as the paper stock is fed to the die roller.

* * * * *